Sept. 2, 1941.  M. J. N. DE MARGITTA  2,254,888

PHOTOFLASH LAMP

Filed Jan. 26, 1940

INVENTOR
M. J. NEUMANN DE MARGITTA.
BY
ATTORNEY

Patented Sept. 2, 1941

2,254,888

UNITED STATES PATENT OFFICE 2,254,888

PHOTOFLASH LAMP

Michael J. Neumann de Margitta, New York, N. Y., assignor to Westinghouse Electric & Manufacturing Company, East Pittsburgh, Pa., a corporation of Pennsylvania Application January 26, 1940, Serial No. 315,744
In Hungary September 5, 1939

4 Claims. (Cl. 67—31)

This application is a continuation in part of my prior applications for improvements in flashlamps, Serial No. 298,276, filed Oct. 6, 1939, and Serial No. 302,023, filed Oct. 30, 1939.

The invention relates to photographic flashlamps and particularly to a flashlamp and apparatus in connection therewith for automatically ejecting the used flashlamp and replacing it with a new flashlamp.

An object of the invention is to provide a flashlamp wherein the effect of the flashing on the casing will start the ejection of the flashlamp from its position.

Another object of the invention is to provide a mechanism in combination with a special type of photoflash lamp for automatically and immediately reloading the flashlamps in position when one has been flashed.

Other objects and advantages of the invention will be apparent from the following description and drawing, in which.

While commercial flashlamps have advanced the photographic art by making possible the taking of pictures in situations where otherwise sufficient light is not available, yet the time taken in unscrewing the bulb and replacing the used bulb with another, has limited the number of pictures that can be taken in a given time. The result has been that there is a considerable lapse of time between pictures when the train of events photographed has had a fast reaching climax. Newspaper readers are very familiar with the reproduction of two or three flashlight pictures of some scene of events where movies could not be taken. These two or three pictures would be accompanied by a considerable explanation of the intermediate action between the pictures reproduced. It is an object of my invention to provide means for rapidly taking a series of pictures by flashlamps so that the successive change of events can be recorded pictorially with the same camera.

Figure 1:
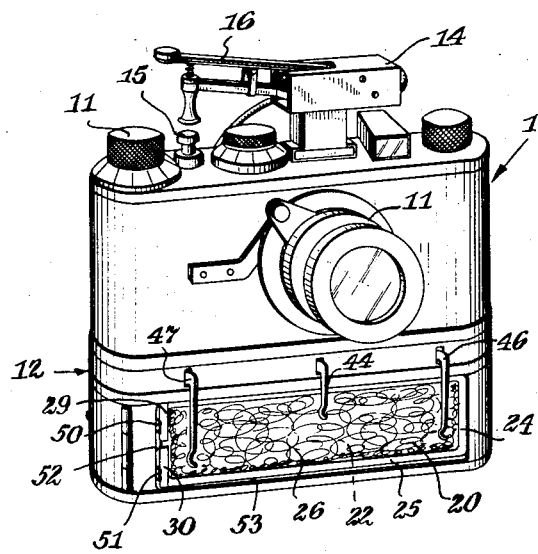
Fig. 1 is a perspective view of a camera loaded with my particular type of flashlamp and a mechanism for automatically ejecting used flashlamps.

In Fig. 1 I have illustrated a familiar type of camera 10 with its lens and shutter 11 and various adjustments thereon. This camera I provide with a special casement attachment 12 which may be located conveniently on the bottom portion thereof by any suitable securing means. If the attachment is sold with the camera, it could be attached thereto by the dovetailed joint 13 illustrated in Fig. 3, so that the casing 12 could be removed when the flashlamps are not to be utilized.

In order to synchronize the shutter action with the flashlamps, I provide an attachment 14 adjacent the shutter actuating button or lever 15. This synchronizing attachment may have various forms, and one of these forms is illustrated perspectively in the first figure and diagrammatically in Fig. 2. This attachment comprises preferably a lever 16 to be actuated by the photographer and the depression of this lever makes first a contact with the connections 17 and 18 connected to a battery 19 and to the flashlamp 20. This electrical contact is immediately followed by the action of the shutter. While the shutter is being opened, the current from the battery has ignited the ignition means 21, comprising preferably a filament coated with zirconium, aluminum or phosphorous powder. The ignition of this powder starts the rapid combustion of the fine film or wires 22 of aluminum or magnesium. By the time the combustion of this material has reached its maximum light giving intensity, the shutter has been opened and is ready to close.

My particular type of flashlamp has a special property that permits its ready ejection from the camera by suitable auxiliary apparatus. My flashlamp, in particular, has a tough yet thin and flexible casing of a plastic material such as cellulose acetate. As explained in my co-pending applications, other plastics may be used, but I prefer cellulose acetate because, in addition to its flexibility and toughness, it is difficult to burn. This enclosing envelope of cellulose acetate is filled with an active gas such as oxygen, and upon combustion of the material 22 the casing expands by reason of the increased volume of gas created by the burning of the materials and the increased temperature therein.

Figure 2:
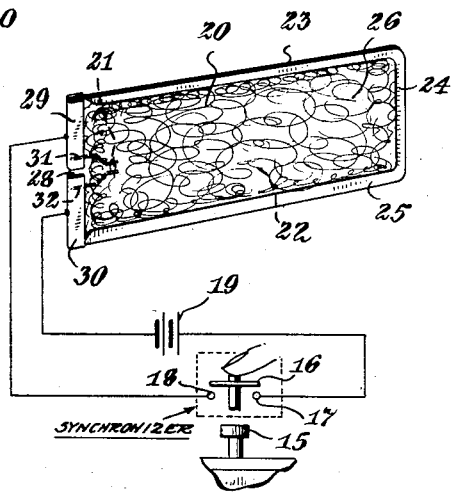
Fig. 2 is a view partly diagrammatic and partly in perspective of the electrical circuit and a preferred type of flashlamp.
Figure 3:
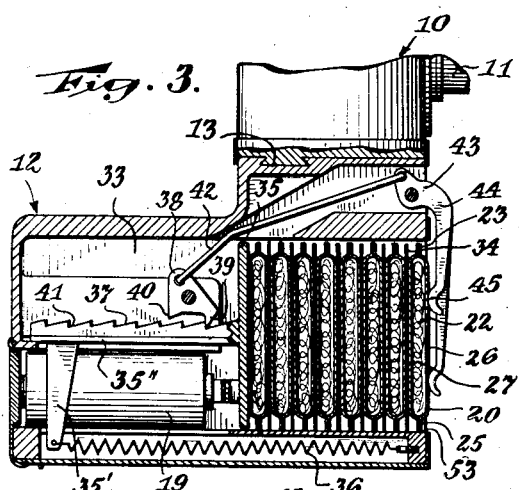
Fig. 3 is a view mainly in transverse cross-section of the lower portion of the camera of Fig. 1.

While many forms and shapes may be utilized for the flashlamp, I prefer to utilize the elongated oblong shaped envelope disclosed in perspective in Fig. 2 and in cross-section in Fig. 3.

This flashlamp comprises preferably two substantially parallel dish-like portions 26, 27 of cellulose acetate welded or cemented upon the three edges or sides 23, 24 and 25. The fourth side 28 preferably has its major portion between two metal clamps 29 and 30, with a slight space of cellulose acetate for electrical insulation between these two metal portions.

The metal clamps 29 and 30 are connected on the exterior to the connections from 17 and 18 and also make contact to the connections 31 and 32 through the casing to the igniting means 21. The casing is preferably of cellulose acetate of a thickness of .005 to .02 inch, and the oxygen filling, in combination with the toughness of the cellulose acetate, maintains it in the desired shape.

A series of these flashlamps are placed in the bottom compartment 33 of the lower attachment 12 of the camera. If desired, these flashlamps may have an intermediate sheet 34 pasted to the back of each sheet. This sheet may be of some opaque protecting material such as asbestos and this may be coated with a reflecting coating adjacent the flashlamp for efficiency in directing all the light towards the space in front of the camera. The reflecting surface, of course, could be placed on either the outside or inside of the back wall of the flashlamp if desired.

The series of flashlamps in the bottom part of the casing bear against the back 35, which would be normally pushed towards the front of the compartment under the influence of such means as the spring 36 connected to an extension of the back 35 such as arm 35' fastened to a slide 35" which is connected to the back 35. The movement forward, however, is prevented by a ratchet means preferably attached to the slide 35", and this ratchet has the familiar double toothed stop 38 with its teeth 39 and 40 to permit the movement forward of the distance of one of the teeth 41 of the ratchet device. This stop 38 is pivoted just above the ratchet device and has the end opposite the ratchet attached to an arm 42 extending to the lever 43 preferably pivoted just within the casing walls and having an exterior arm 44 extending downward and making a restraining contact 45 with the front face of the flashlamp 20. This lever can be made very thin so as not to interfere to any extent with the light sent forth from the flashlamp. Where a long flashlamp is utilized, such as that illustrated in Fig. 1, three levers 44, 46 and 47 can make contact with the top central portion and the bottom right and bottom left portions of the front of the first flashlamp. Any number of levers can be used. It will be noted that the casing 12 provides a convenient place for locating the battery 19 for energizing the flashlamps. The connections from this battery and the contacts 18 and 17 and switch 16 extend to two metal clips 50 and 51, on one edge 52 of the opening 53 to this compartment 33 containing the flashlamps. As the flashlamps are pressed forward under action of the device, the metal contact clamps 29 and 30 on the lamp will be pressed into contact with these connecting clips 50 and 51.

Figure 4:
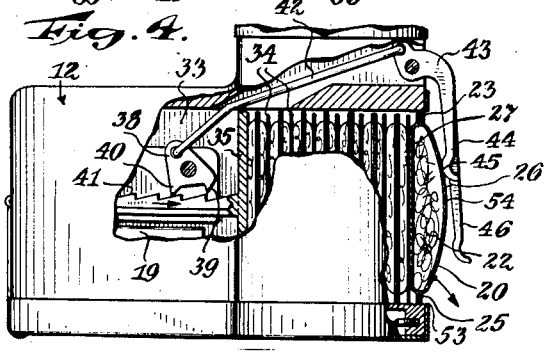
Fig. 4 is a view similar to Fig. 3 illustrating the action of the mechanism subsequent in time to that of Fig. 3.

Fig. 3 illustrates the camera and flashlamp chamber ready for operation. The camera and flashlamp are actuated by the actuating means 16 being pressed downward on the shutter actuating mechanism 15 and the contacts 17 and 18. The flashlamp is ignited and Fig. 4 illustrates the point when the first line flashlamp has reached its maximum interior pressure, which practically coincides with the maximum intensity of light produced therein. This maximum pressure produces a bulging out of the front casing as indicated at 54. This bulging out actuates the levers as indicated to throw the stop mechanism 38 to permit the movable back 35 to move forward the distance of a tooth 41 in the ratchet illustrated. This distance of travel is the thickness of one of the flashlamps. As the first flashlamp slides forward, it slips downwardly and outwardly from under the levers 44, 46 and 47. The clips 50 and 51 are not successful in retaining this flashlamp under this pressure because there is no similar restraint on the opposite end of the flashlamp, which naturally falls first. With the removal of this first flashlamp, the second flashlamp slides into place and the camera and flashlamp are automatically set for the next picture from the same camera.

Figure 5:
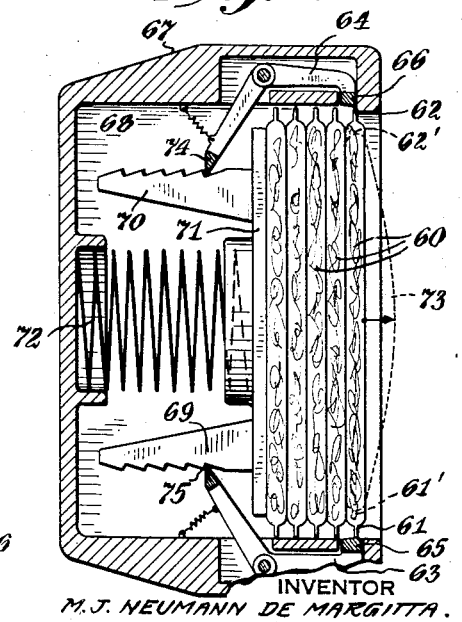
Fig. 5 is a cross-sectional view of a slightly modified form of the ejecting device.

In Fig. 5 I have illustrated a slight modification of the invention, in which a very long flashlamp 60 is illustrated. This lamp 60 has projecting edges 61 and 62 that are held by ends 65 and 66 of levers 63 and 64 pressing against these edges. These levers are pivoted in the sides of the casing 67 having a central opening 68 for the flashlamps and actuating mechanism. The opposite ends of these levers are connected into one of a series of notches of the ratchet devices 69 and 70 connected to a back 71 pressing against the series of elongated flashlamps 60. A spring 72 presses against this movable back 71, but is restrained by the levers 63 and 64 in the ratchet devices 69 and 70.

The property of my elongated flashlamp that I utilize in this construction is that the flashing of the bulb will bow the central portion of the flashlamp as indicated at 73, and this will remove the tip ends 61 and 62 away from the restraining ends 65 and 66 of the levers as illustrated at 61' and 62'. The levers, in following this movement of the ends of the lamp, will move inward and permit the opposite ends 74 and 75 of these levers to slip to the next notch in the ratchet device 69 and 70. This movement of the levers will permit the spring 72 to push forward the back 71 the thickness of the flashlamp and expel the first used flashlamp. By the time the second flashlamp reaches the front of the opening 68 the restraining tip ends 65 and 66 of the levers will be in a position to hold it there.

In accordance with the patent statutes, I have described preferred embodiments of my invention. It is apparent, however, that many modifications may be made in the particular type of apparatus and the flashlamp to be attached thereto without departing from the spirit of the invention. Accordingly, I desire only such limitations to be placed upon my invention as are necessitated by the spirit and scope of the following claims.

I claim:

1. A casing, a plurality of flashlamps therein having flexible envelopes expanding when flashed, means for flashing the flashlamps and means responsive to the expansion of the envelope for automatically ejecting a flashlamp from said casing.

2. A casing, a plurality of flashlamps having flexible envelopes arranged one behind the other within said casing and adjacent an opening thereof, electrical connections on said casing for making contact to the first of said flashlamps, and means responsive to the expansion of the flexible envelope of the first flashlamp upon flashing to automatically eject it from the casing.

3. A casing, a plurality of flashlamps having flexible envelopes arranged one behind the other within said casing and adjacent an opening thereof, electrical connections on said casing for making contact to the first of said flashlamps, and means responsive to the expansion of the flexible envelope of the first flashlamp upon flashing to automatically eject it from the casing, and to automatically replace it with the next flashlamp.

4. A casing, a plurality of flashlamps having flexible envelopes arranged one behind the other within said casing and adjacent an opening thereof, a lever in contact with the envelope of the first of said flashlamps at the opening of the casing, and adapted to be actuated by the expansion of said flexible casing when flashed, and means connected to said lever for ejecting said first flashlamp from said casing when said lever is actuated.

MICHAEL J. NEUMANN DE MARGITTA.